UNITED STATES PATENT OFFICE.

VICENTE MARCANO, OF CARACAS, VENEZUELA.

MAKING VEGETABLE PEPSIN.

SPECIFICATION forming part of Letters Patent No. 441,182, dated November 25, 1890.

Application filed January 10, 1890. Serial No. 336,585. (Specimens.)

*To all whom it may concern:*

Be it known that I, VICENTE MARCANO, of Caracas, Republic of Venezuela, a citizen of Venezuela, have discovered a new Process of Making Organic Vegetable Ferments, of which the following is a specification.

The invention is based on my discovery that the plants belonging to the family of *Bromeliaceas*, (Linn.) of which the pine-apple is the best-known type, contain organic vegetable ferments which can be successfully employed as peptonizing agents for the manufacture of meat peptones, collagenous peptones, peptones from the nitrogenous elements of animal milk, &c. At the same time said ferments may be employed as a medicinal agent for promoting digestion and for restoring and strengthening the digestive power of the human system.

The invention relates to the production of the organic vegetable ferments from the juice of the plants of the *Bromeliaceas*, so as to facilitate the transportation and the application of said ferments to industrial and therapeutical purposes; and the invention consists of a new pepsin or organic vegetable ferment, which is obtained from the juice of the plants of the *Bromeliaceas*, and which has the physical properties and characteristics hereinafter set forth.

In practically carrying out my invention the pine-apples, for example, are reduced to a pulp and submitted to the action of a press. The juice thus expressed is filtered in order to separate the fibrous and other impurities therefrom. Next the juice is condensed at a temperature not exceeding 45° Celsius.

This ferment is a new substance which is to be used in this form for manufacturing purposes in producing peptonized foods from meat, milk, blood, collagenous substances, and other albuminoids.

If it be desired to separate the organic ferment from the saccharine matter and from other impurities of the juice, the condensation of said juice is continued up to a density of 35° to 40° Baumé. It is then treated with alcohol of 95° centesimal scale. The precipitate obtained contains the active ferments mixed with the gum of the juice. This precipitate is either dried at a temperature not exceeding 45° Celsius in order to obtain a solid product or it is condensed into the form of a paste.

This product is a new vegetable pepsin, which is to be used for peptonizing albuminous and collagenous substances, as well as a therapeutical agent to promote digestion.

In place of the juice of the pine-apple the juice of any other fruit of the family of *Bromeliaceas* or even the juice of the leaves may be employed.

This digestive ferment is an absolutely new product and entirely different from the papain already known as a ferment extracted from the *Carica-Papaya*.

A characteristic that distinguishes specially the digestive ferment obtained from the juice of the *Bromeliaceas* is that by treating collagenous substances with it it changes them into an absolutely soluble hydrated collagen, while said substances are only rendered diffusible but not soluble when treated by other known methods of peptonization.

The physical properties of the new vegetable pepsin are as follows: It has a greenish-white color, a sweetish and slightly-sour taste, it dissolves readily in sulphuric acid at ordinary temperature, assuming first a greenish-brown, then a darker brown, and finally a deep-brown red. When heated, it is carbonized without melting together and emanates fumes resembling those of burning sugar, which shows that it contains no nitrogen. Papain, treated in the same manner, melts and emanates fumes whose odor resembles that of burned hair, which proves it to be a nitrogenous compound.

Having thus described my invention, I claim as new and desire to secure by Letters Patent—

The herein-described new pepsin, being an organic vegetable ferment of a greenish-white color and a sweetish and slightly-acid taste, and possessing the property of peptonizing the albuminoids of meat, milk, and collagenous substances without the aid of any acid, and dissolving readily in water and in sulphuric acid at ordinary temperature, said pepsin carbonizing without melting, while emanating fumes resembling those of burned sugar, and being obtained by condensing the juice expressed from the *Bromeliaceas* plants at a temperature not exceeding 45° Celsius to a density of 40° Baumé, and precipitating it with alcohol, substantially as set forth.

In testimony that I claim the foregoing as my invention I have signed my name in presence of two subscribing witnesses.

VICENTE MARCANO.

Witnesses:
ED. MARTURET,
HERIBERT LOBO.